United States Patent [19]
Shinoda et al.

[11] Patent Number: 5,220,852
[45] Date of Patent: Jun. 22, 1993

[54] MOTOR-EQUIPPED REDUCTION GEAR DEVICE WITH A PRE-STAGE

[75] Inventors: Hiroyuki Shinoda; Yoshikazu Chiba, both of Aichi, Japan; Sepp G. Lachenmaier, Bruchsal; Thomas Stapelfeldt, Karlsdorf-Neuthard, both of Fed. Rep. of Germany

[73] Assignee: Sumitomo Heavy Industries, Ltd., Tokyo, Japan

[21] Appl. No.: 862,135

[22] Filed: Apr. 2, 1992

[30] Foreign Application Priority Data

Apr. 4, 1991 [JP] Japan .................... 3-99589

[51] Int. Cl.⁵ .............................. F16H 57/02
[52] U.S. Cl. .................. 74/606 R; 74/421 A; 74/467
[58] Field of Search ............... 74/606 R, 607, 467, 74/421; 475/83, 745

[56] References Cited

U.S. PATENT DOCUMENTS

| | | | |
|---|---|---|---|
| 1,988,338 | 1/1935 | Schmitter et al. | 74/421 |
| 3,234,808 | 1/1964 | Nelson | 74/421 |
| 5,056,213 | 10/1991 | Behnke et al. | 74/606 R |
| 5,058,455 | 10/1991 | Nemoto et al. | 74/745 |
| 5,092,196 | 3/1992 | Kameda et al. | 74/606 R |
| 5,092,736 | 3/1992 | Herlitzek | 74/606 R |
| 5,107,718 | 4/1992 | Inagawa | 74/467 X |

FOREIGN PATENT DOCUMENTS

| | | | |
|---|---|---|---|
| 660285 | 3/1963 | Canada | 74/606 R |
| 132606 | 4/1933 | Fed. Rep. of Germany . | |
| 1023646 | 1/1958 | Fed. Rep. of Germany . | |
| 25707786 | 3/1986 | France | 74/606 R |
| 508178 | 7/1939 | United Kingdom . | |

*Primary Examiner*—Vinh T. Luong
*Attorney, Agent, or Firm*—Nikaido, Marmelstein, Murray & Oram

[57] ABSTRACT

In a motor-equipped reduction gear device with a pre-stage, two covers, which have been indispensable in the past, namely a joint cover and a pre-stage cover, are integrated into a one-body cover (130). Also, the diameter (D1) of the addendum circle of the pinion (110) mounted on the tip of the motor shaft 108 is designed to be smaller than the diameter (D2) of the portion of the motor shaft (108) which extends into the one-body cover (130). This allows the one-body cover (130) to be mounted with the pinion (110) already attached to the tip of the motor shaft (108). The one-body cover (130) can freely and easily be attached to the motor (102) and the gear box (106). As a result, the number of parts is reduced and light weight and compactness are achieved, and accuracy of the center distance and parallelism are improved because cumulative machining errors can be avoided. Furthermore, cost down and improved rigidity are achieved and the number of factors which may cause oil leakage is decreased.

1 Claim, 4 Drawing Sheets

MOTOR-EQUIPPED REDUCTION GEAR DEVICE WITH A PRE-STAGE

BACKGROUND OF THE INVENTION

1. Field of the Invention

The present invention relates to a motor-equipped reduction gear device with a so-called pre-stage.

2. Description of the Prior Art

As shown in FIG. 3, normally a motor-equipped reduction gear device (a so-called geared motor) is composed of a motor 2, a joint cover 4 and a gear box 6. A pinion 10 is mounted on the tip of the motor shaft 8 of the motor 2. The pinion 10 meshes with a first-stage gear 15 in the gear box 6. The joint cover 4 is mounted in order to cover and protect the portion where the motor 2 and the gear box 6 are linked.

Normally the gear box 6 comprises plural (1-3 or 4) built-in gear pairs. These gear pairs provide specified speed reduction ratios.

Cylindrical gears with parallel axis, bevel gears, worm gears or planetary gears are examples of these gear pairs.

For example, the speed reduction ratio which can be achieved with two gear pairs consisting of cylindrical reduction gear with parallel axes (a so-called in-line type) is normally 25 (=5×5) and approximately 70 (=10×7) at maximum.

Accordingly, in order to obtain a bigger speed reduction ratio, it is necessary to provide one or two additional gear pairs between the motor 2 and the gear box 6, as shown in FIG. 4. In general, an additional speed reduction mechanism like this provided between the motor 2 and the gear box 6 is called a pre-stage.

In FIG. 4, a pre-stage with one gear pair is shown. That is, the pinion 10 mounted on the tip of the motor shaft 8 meshes with the gear 12. The pinion 10 and the gear 12 cause a speed reduction of the motor rotation before the motor rotation is transmitted to the gear box 6. The reduced rotation is transmitted through the pinion 14 to the first-stage gear 15 in the gear box 6.

Reference numerals 40, 42 and 44 indicate bearings.

However, if such a pre-stage is provided, the additional gear 12 and pinion 14 are necessary. The gear 12 and pinion 14 in turn require a supporting mechanism, which causes the problem that an additional pre-stage cover 16 must be provided between the joint cover 4 of the motor and the gear box 6.

That is, in addition to the joint cover 4, the pre-stage cover 16 must be provided between the motor 2 and the gear box 6 in order to obtain bigger speed reduction ratio than the reduction ratio which originally the conventional geared motor has. In short, there is the problem that two types of covers have to be mounted.

In general, the pro-stage cover 16 is fixed to the gear box 6 with bolts 18 and to the joint cover 4 with bolts 20. This means that number of bolt connections increase, which in turn involves the problem like that it takes longer assemble time and appearance and shape of geared motor are largely restricted.

Furthermore, the area necessary for mounting the geared motor with a pre-stage on a matcing machine increases, especially the axial length becomes longer, which causes many problems such as losing of compactness, increasing of weight and increasing a chance of easily arising difficulties for assembly.

Also, since the motor 2 and the gear box 6 are linked by two members, the machining errors of each member are added up so that the accuracy of the center distance and the parallelism between the pinion 10 and the gear 12 decrease. This causes non-uniform contact between the tooth surfaces of the gear, which is obstructive to the smooth rotation of the gear and which reduces the life of the gear.

Furthermore, the large number of necessary parts causes an increase in costs and a decrease in the rigidity as compared to a one-body product. Also, the large number of faces which have to be connected to each other causes the problem of increasing a chance of easy oil leakage.

SUMMARY OF THE INVENTION

The present invention was carried out in view of these difficulties. It is an object of the present invention to simplify the structure of a motor-equipped reduction gear device with a pre-stage and to largely maintain the original performance of the reduction gear. It is a further object of the present invention to provide a more compact and low-cost motor-equipped reduction gear device with a pre-stage.

To achieve this aim, the present invention provides a motor-equipped reduction gear device with a pre-stage in which the joint cover of the motor and the cover of the pre-stage are integrated into one body and in which the diameter of the addendum circle of the pinion provided at the tip of the motor shaft is set to be smaller than the diameter of the motor shaft portion which extends into the one-body cover.

In the present invention, the joint cover of the motor and the cover of the pre-stage are integrated into one body. In addition to that, the diameter of the addendum circle of the pinion mounted (or direct-cutted) on the tip of the motor shaft is arranged to be smaller than the diameter of the motor shaft portion which extends into the one-body cover.

As a result, in addition to integrating the cover into one body, it is possible to pre-connect the pinion, which is to be mounted on the tip of the motor shaft, to the motor shaft. This allows the gear pair of the pre-stage to be freely and easily assembled.

That is, the present invention provides an easy assembly, improvement in the rigidity, reduction of oil leakage and achievement of low costs, due to a reduction in the number of parts. Furthermore, since the accuracy of the center distance and parallelism within the pre-stage can be largely maintained, the present invention provides the outstanding effect of giving full play to the original transmission functions of a pre-stage.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts and wherein.

DESCRIPTION OF THE PREFERRED EMBODIMENTS

The preferred embodiments of the present invention will be described in detail hereinunder with reference to the drawings.

Figure 1:
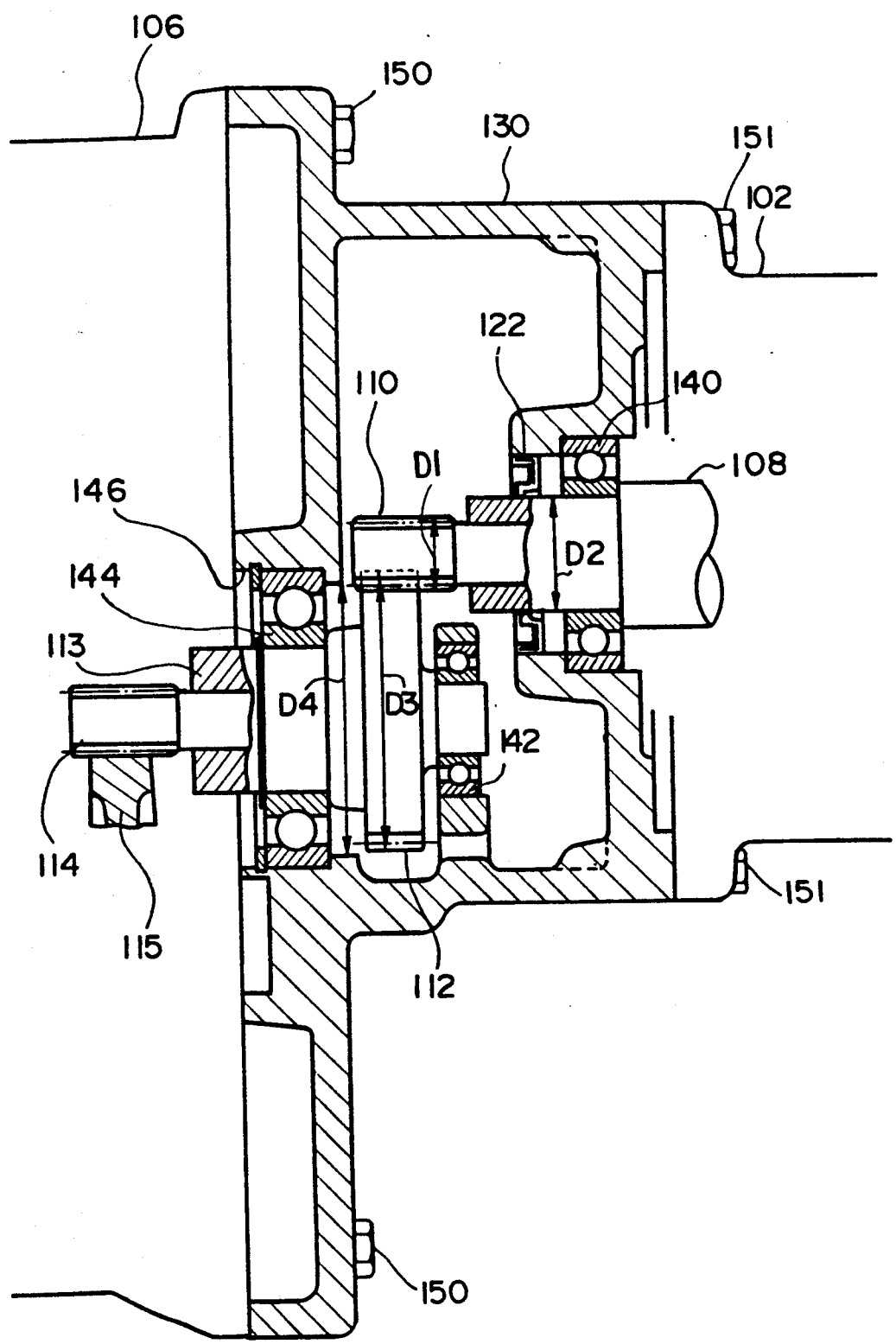
FIG. 1 is a cross sectional drawing showing the pre-stage of the first embodiment according to the present invention.

FIG. 1 shows the first embodiment according to the present invention.

In FIG. 1, reference numerals 102, 130 and 106 indicate a motor, a one-body cover and a gear box, respectively. The one-body cover 130 is fixed to the motor 102 and the gear box 106 by bolts 151 and 150, which are provided at appropriate locations.

The pre-stage of this embodiment has one gear pair.

The diameter D1 of the addendum circle of the pinion 110 mounted on the tip of the motor shaft 108 is set to be smaller than the inner diameter D2 of a sealing member 122 which serves as an oil seal between the one-body cover 130 and the motor shaft 108. (The inner diameter D2 of the sealing member 122 corresponds to the outer diameter of the portion of the motor shaft 108 which extends into the one-body cover 130.)

In FIG. 1, reference numerals 112 and 114 indicate a gear in the pre-stage and a pinion in the gear box, respectively. The gear 112 and the pinion 114 correspond to the conventional gear 12 and pinion 14.

Furthermore, in FIG. 1, reference numeral 140 indicates a bearing for supporting the motor shaft 108 and reference numerals 142 and 144 indicate bearings for supporting a shaft 113 on which the gear 112 and the pinion 114 are mounted. The bearings 140, 142 and 144 correspond to the conventional bearings 40, 42 and 44, respectively.

The function of this embodiment will be described hereinafter.

Since the diameter D1 of the addendum circle of the pinion 110 mounted on the tip of the motor shaft 108 is smaller than the inner diameter D2 of the sealing member 122, it is possible to pre-connect (or direct-cut) the pinion 110 to the motor shaft 108. That is, the one-body cover 130 can be attached to the motor 102 with the pinion 110 mounted (or cutted directly) on the motor shaft 108.

Also, in this embodiment, since the diameter D3 of the addendum circle of the gear 112 in the pre-stage is smaller than the smallest inner diameter D4 of the mounting hole 146 for the bearing 144, it is possible to assemble the gear 112 from the side of the gear box 106 following the assembly of the one-body cover 130 to the motor 102.

However, if the diameter D3 of the addendum circle of the gear 112 is greater than the inner diameter D4 of the mounting hole 146. The one-body cover 130 can be assembled to the motor 102 following the assembly of the gear 112 to the one-body cover 130. Thereafter, the one-body cover 130 can be assembled to the gear box 106 while keeping the pinion 114 in mesh with the first-stage gear 115 in the gear box 106.

The rotation of the motor shaft 108 is reduced by means of the gear pair consisting of the pinion 110 and the gear 112. That is, the rotation is reduced by the gear pair of the so-called pre-stage. Then the pre-reduced rotation is transmitted through the pinion 114 to the first-stage gear 115 in the gear box 106. Accordingly, a total speed reduction ratio that is equal to the speed reduction ratio achieved within the gear box 106 multiplied by the speed reduction ratio achieved by the pinion 110 and the gear 112 is obtained.

Figure 2:
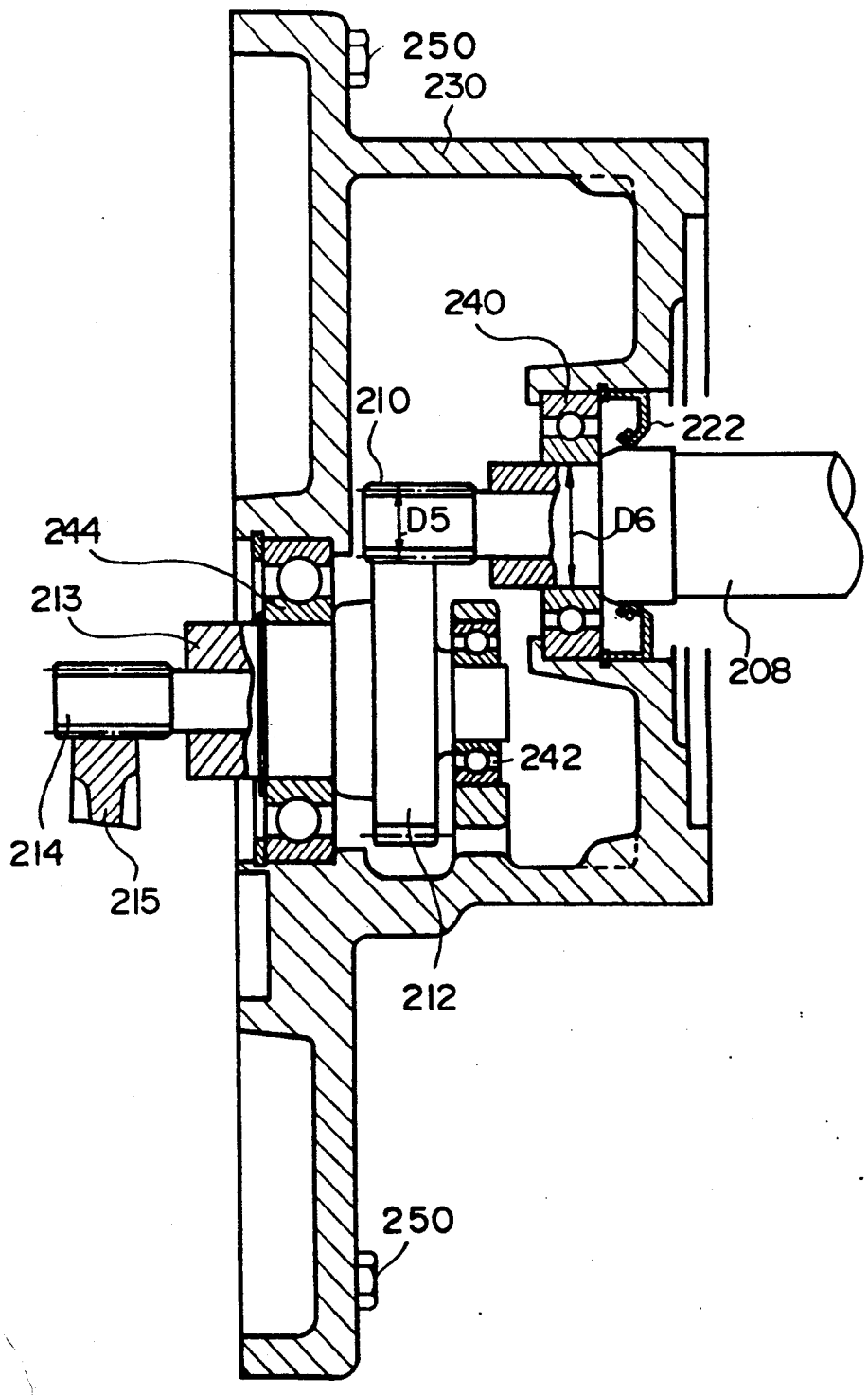
FIG. 2 is a partial cross sectional drawing showing the second embodiment according to the present invention.
Figure 3:
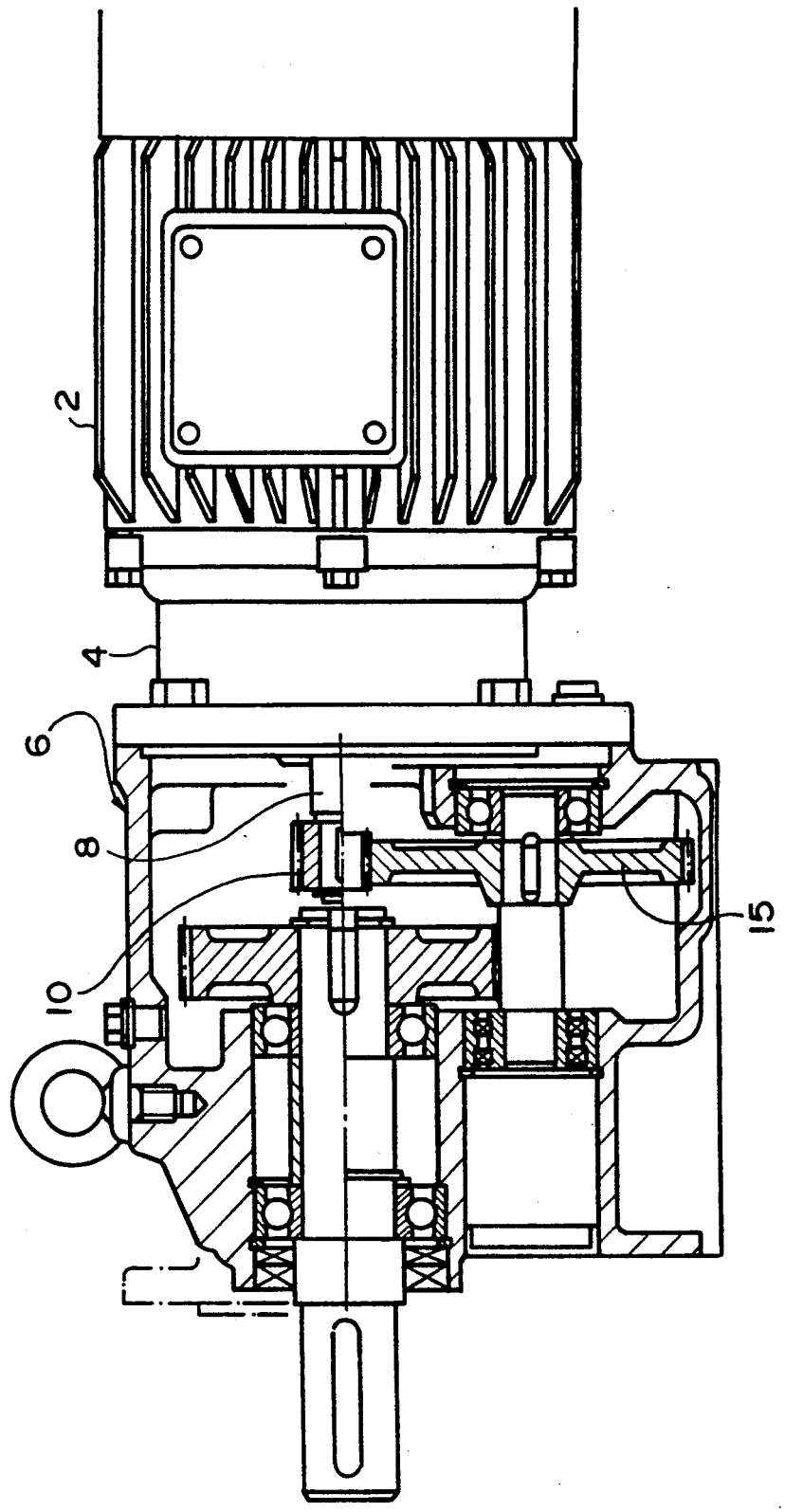
FIG. 3 is a cross sectional drawing showing an example of a conventional motor-equipped reduction gear.
Figure 4:
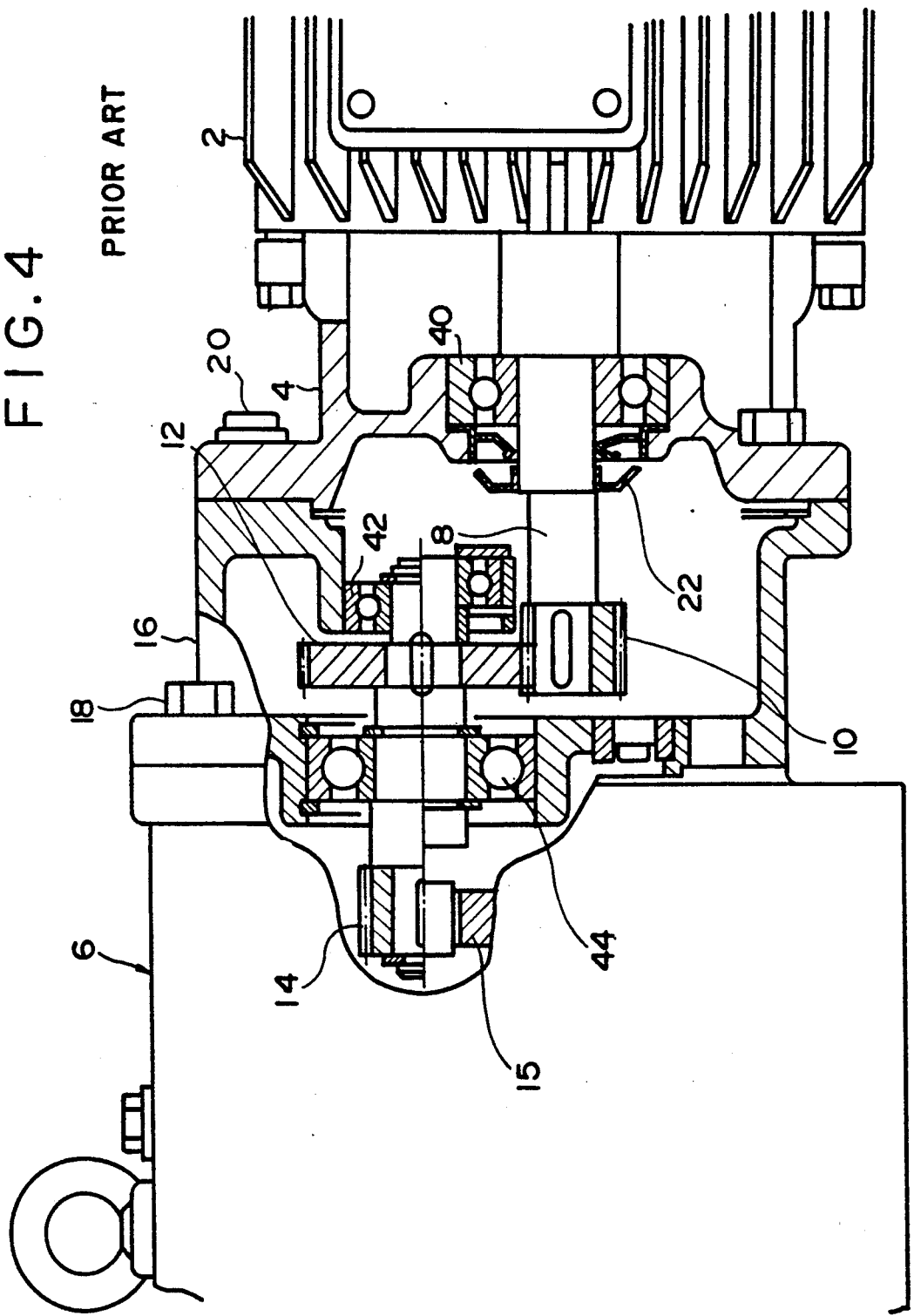
FIG. 4 is a partial cross sectional drawing showing a conventional motor-equipped transmission with a pre-stage.

FIG. 2 shows the second embodiment according to the present invention.

In this embodiment, the position of the sealing member 222, which serves as an oil seal for the motor shaft 208, and the position of the bearing 240 are reversed with respect to the axial direction.

In this case too, as long as the diameter D5 of the addendum circle of the pinion 210 mounted on the tip of the motor shaft 208 is set to be smaller than the diameter D6 of the motor shaft 208, the existence of the bearing 240 which supports the motor shaft 208, and the sealing member 222 does not cause any obstacles, because it is possible to freely pass through the sealing member 222 and the bearing 240 with the pinion 210 mounted on the motor shaft 208. Accordingly, the second embodiment provides the same effect as the first one.

Since the rest of the structure and the function are the same as those of the first embodiment, identical parts are denoted by reference numerals the last two digits of which are identical to the last two digits of the reference numerals in FIG. 1. To avoid repetition, a detailed description of the second embodiment is omitted.

In the above-described embodiments, the pre-stage comprises a single gear pair. However, actually the pre-stage may comprise more than two gear pairs.

According to the embodiments, speed reduction gear device, which in the past required two covers, namely a joint cover and a pre-stage cover, requires only a single one-body cover. Therefore, the number of bolt connections can be decreased and light weight and compactness can be achieved.

Furthermore, integration of the pre-stage into the one-body cover eliminates the problem of cumulative machining errors which cause a decrease in the accuracy of the center distance and parallelism of the gear pair in the pre-stage. Also, the occurrence of non-uniform contact between the tooth surfaces of the gear is eliminated. As a result, it is possible to largely maintain the original speed reduction characteristics of a pre-stage for a long period of time.

Also, the linkage of the motor and gear box by one member reduces the number of parts, which in turn reduces assembly time and costs. Moreover, rigidity can be largely maintained and oil leakage from between the faces which connect the past joint cover and the past pre-stage cover can be prevented.

Incidentally, if the motor and the pre-stage (with built-in gear) are stored as one assembly kit, the assembly kit will be able to provide the function of a low-speed motor.

What is claimed is:

1. A motor-equipped reduction gear device including a motor, a gear box, and a joint cover which joins said motor and said gear box, said motor including a pinion on a tip of a shaft thereof; comprising:
   a pre-stage reduction mechanism provided between said motor and said gear box; and
   an integrated pre-stage cover which is integrated with said joint cover, and which encases said pinion on said tip of said shaft and said pre-stage reduction mechanism,
   wherein an addendum circle of said pinion is smaller than a diameter of said tip of said shaft which is encased by said pre-stage cover, and wherein said pinion is disposed on said shaft prior to assembly.

* * * * *